(12) United States Patent
Ahn et al.

(10) Patent No.: US 10,795,218 B2
(45) Date of Patent: Oct. 6, 2020

(54) DISPLAY SUBSTRATE AND LIQUID CRYSTAL DISPLAY DEVICE INCLUDING THE SAME

(71) Applicant: SAMSUNG DISPLAY CO., LTD., Yongin-si, Gyeonggi-do (KR)

(72) Inventors: Kyusu Ahn, Seoul (KR); Haeryeong Park, Hwaseong-si (KR); Dongil Yoo, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 216 days.

(21) Appl. No.: 15/252,494

(22) Filed: Aug. 31, 2016

(65) Prior Publication Data
US 2017/0139284 A1    May 18, 2017

(30) Foreign Application Priority Data
Nov. 18, 2015   (KR) .................. 10-2015-0161499

(51) Int. Cl.
*G02F 1/1343* (2006.01)
*G02F 1/1337* (2006.01)
(52) U.S. Cl.
CPC .. *G02F 1/134336* (2013.01); *G02F 1/134309* (2013.01); *G02F 1/133707* (2013.01); *G02F 2001/134345* (2013.01); *G02F 2201/122* (2013.01); *G02F 2201/123* (2013.01); *G02F 2203/30* (2013.01)
(58) Field of Classification Search
USPC ...................................... 349/141
See application file for complete search history.

(56) References Cited

U.S. PATENT DOCUMENTS

| 6,256,081 | B1* | 7/2001 | Lee | G02F 1/134363 349/141 |
|---|---|---|---|---|
| 2007/0070282 | A1* | 3/2007 | Shibahara | G02F 1/134363 349/141 |
| 2011/0199550 | A1* | 8/2011 | Fan | G02F 1/133707 349/33 |
| 2012/0044448 | A1 | 2/2012 | Kim et al. | |
| 2013/0194536 | A1* | 8/2013 | Tae, II | G02F 1/133707 349/143 |
| 2013/0258264 | A1* | 10/2013 | Peng | G02F 1/134309 349/139 |

(Continued)

FOREIGN PATENT DOCUMENTS

| KR | 10-2012-0017351 A | 2/2012 |
|---|---|---|
| KR | 10-2015-0004140 A | 1/2015 |

*Primary Examiner* — Edward J Glick
*Assistant Examiner* — David Y Chung
(74) *Attorney, Agent, or Firm* — Kila Park Reed & Houtteman PLLC

(57) ABSTRACT

A display substrate may include a base substrate having a plurality of pixel areas; and a pixel electrode in each of the pixel areas. The pixel electrode may include a vertical stem portion extending in a first direction; a horizontal stem portion extending from the vertical stem portion in a second direction intersecting the first direction; a plurality of main branch portions extending from at least one of the vertical stem portion and the horizontal stem portion in an inclined manner; and a sub-branch portion extending from at least one of the plurality of main branch portions.

20 Claims, 10 Drawing Sheets

(56) References Cited

U.S. PATENT DOCUMENTS

| | | | |
|---|---|---|---|
| 2014/0267994 A1* | 9/2014 | Ryu | G02F 1/133707 |
| | | | 349/141 |
| 2015/0009442 A1 | 1/2015 | Lee et al. | |
| 2015/0009465 A1* | 1/2015 | Park | G02F 1/133707 |
| | | | 349/139 |
| 2015/0036073 A1* | 2/2015 | Im | G02F 1/1333 |
| | | | 349/48 |
| 2015/0077672 A1* | 3/2015 | Rho | G02F 1/133707 |
| | | | 349/42 |
| 2015/0323840 A1* | 11/2015 | Yang | G02F 1/134309 |
| | | | 349/139 |
| 2016/0291419 A1* | 10/2016 | Yeh | G02F 1/134309 |

* cited by examiner

DISPLAY SUBSTRATE AND LIQUID CRYSTAL DISPLAY DEVICE INCLUDING THE SAME

CROSS-REFERENCE TO RELATED APPLICATION

Korean Patent Application No. 10-2015-0161499, filed on Nov. 18, 2015, in the Korean Intellectual Property Office, and entitled: "Display Substrate and Liquid Crystal Display Device Comprising the Same," is incorporated by reference herein in its entirety.

BACKGROUND

1. Field

Exemplary embodiments relate to a display substrate and a liquid crystal display ("LCD") device including the display substrate.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

A LCD device may include two substrates with electrodes formed thereon and a liquid crystal layer between the two substrates. Upon applying voltage to the electrodes, the LCD device rearranges liquid crystal molecules of the liquid crystal layer such that an amount of transmitted light is controlled. Such an LCD device generally includes an alignment layer that may align the liquid crystal molecules so as to uniformly control the liquid crystal layer.

SUMMARY

According to an exemplary embodiment, a display substrate may include a base substrate having a plurality of pixel areas; and a pixel electrode in each of the pixel areas. The pixel electrode may include a vertical stem portion extending in a first direction; a horizontal stem portion extending from the vertical stem portion in a second direction intersecting the first direction; a plurality of main branch portions extending from at least one of the vertical stem portion and the horizontal stem portion in an inclined manner; and a sub-branch portion extending from at least one of the plurality of main branch portions.

The sub-branch portion may extend from a main branch portion of the plurality of main branch portions that is connected to the vertical stem portion.

The sub-branch portion may include a protrusion portion extending from the at least one main branch portion in a direction substantially parallel to the vertical stem portion; and a parallel portion extending from the protrusion portion in a direction substantially parallel to the at least one main branch portion.

The protrusion portion may be spaced apart from the vertical stem portion by a distance in a range of about 2 µm to about 10 µm.

The protrusion portion may have a length in a range of about 2 µm to about 10 µm in the first direction in a plan view.

The protrusion portion may extend in the first direction in a plan view in one of an upper direction and a lower direction with respect to the at least one main branch portion.

The parallel portion may be spaced apart from the at least one main branch portion by a distance in a range of about 2 µm to about 10 µm.

According to an exemplary embodiment, a display substrate may include a base substrate having a plurality of pixel areas; and a pixel electrode in the pixel area. The pixel electrode may include a vertical stem portion extending in a first direction; a horizontal stem portion extending from the vertical stem portion in a second direction intersecting the first direction; a plurality of main branch portions extending from at least one of the vertical stem portion and the horizontal stem portion in an inclined manner; and a connecting branch portion connecting at least two main branch portions of the plurality of main branch portions that are adjacent to each other.

The connecting branch portion may be connected to the vertical stem portion.

The connecting branch portion may have a width in a range of about 2 µm to about 10 µm in the second direction.

According to an exemplary embodiment, a liquid crystal display ("LCD") device may include a display substrate; an opposing substrate facing the display substrate; and a liquid crystal layer between the display substrate and the opposing substrate. The display substrate may include a base substrate having a plurality of pixel areas; and a pixel electrode in each of the pixel areas. The pixel electrode may include a vertical stem portion extending in a first direction; a horizontal stem portion extending from the vertical stem portion in a second direction intersecting the first direction; a plurality of main branch portions extending from at least one of the vertical stem portion and the horizontal stem portion in an inclined manner; and a sub-branch portion extending from at least one of the plurality of main branch portions.

The sub-branch portion may extend from a main branch portion of the plurality of main branch portions that is connected to the vertical stem portion.

The sub-branch portion may include a protrusion portion extending from the at least one main branch portion in a direction substantially parallel to the vertical stem portion; and a parallel portion extending from the protrusion portion in a direction substantially parallel to the at least one main branch portion.

The protrusion portion may be spaced apart from the vertical stem portion by a distance in a range of about 2 µm to about 10 µm.

The protrusion portion may have a length in a range of about 2 µm to about 10 µm in the first direction in a plan view.

The protrusion portion may extend from the main branch portion in the first direction in a plan view in one of an upper direction and a lower direction with respect to the at least one main branch portion.

The parallel portion may be spaced apart from the at least one main branch portion by a distance in a range of about 2 µm to about 10 µm.

The LCD device may further include a connecting branch portion connecting at least one pair of main branch portions adjacent to each other among the plurality of main branch portions.

The connecting branch portion may be connected to the vertical stem portion.

The connecting branch portion may have a width in a range of about 2 µm to about 10 µm in the second direction.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1A:
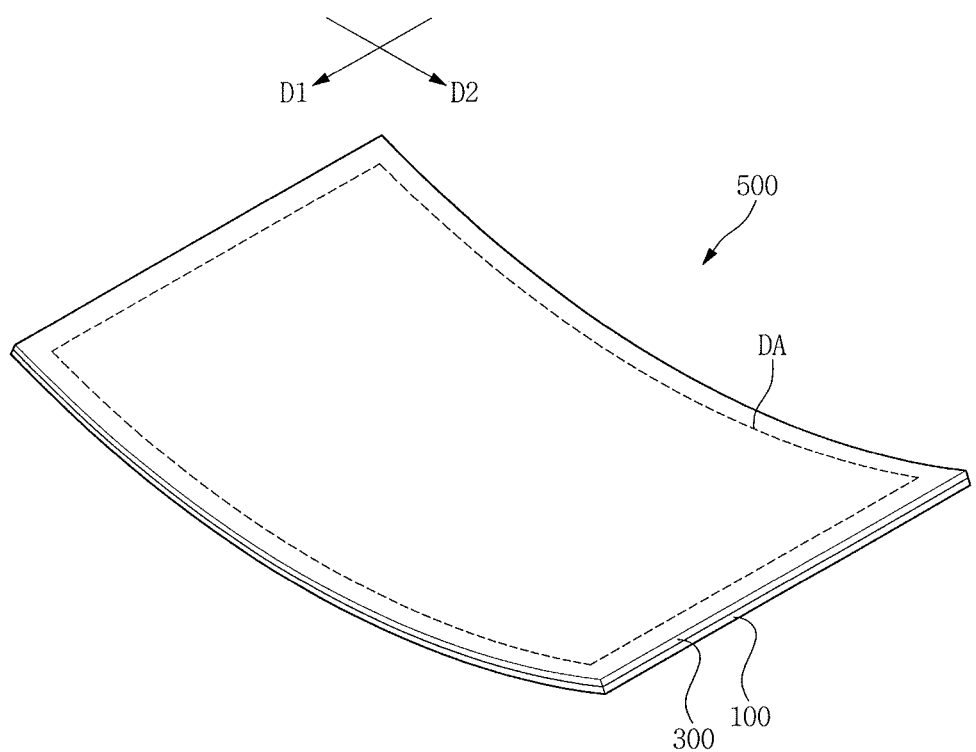
FIG. 1A illustrates a perspective view showing a liquid crystal display ("LCD") device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in this specification.

Hereinafter, a first exemplary embodiment will be described with reference to FIGS. 1A, 1B, 1C, 2, 3, 4, 5, and 6.

Figure 1B:
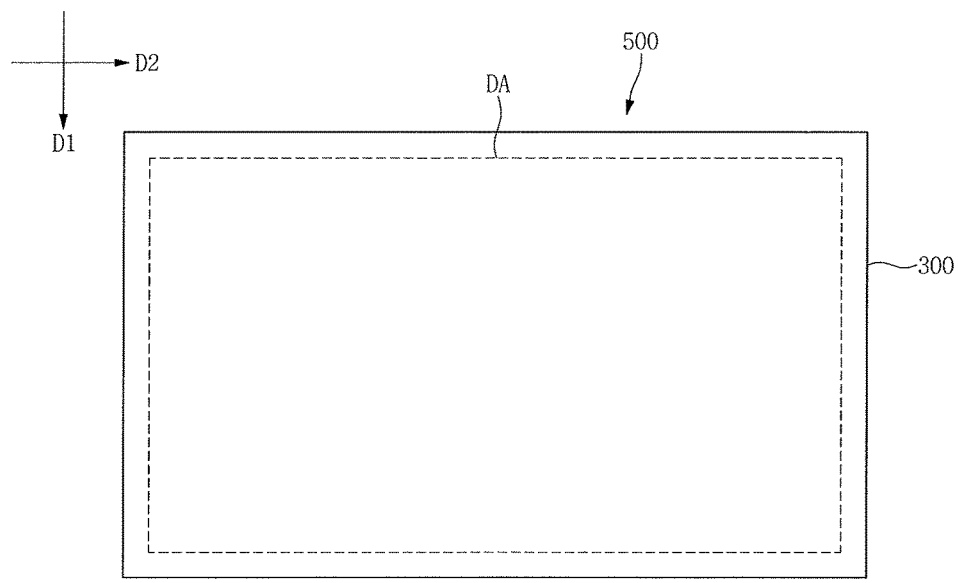
FIG. 1B illustrates a plan view showing the LCD device according to the first exemplary embodiment.
Figure 1C:
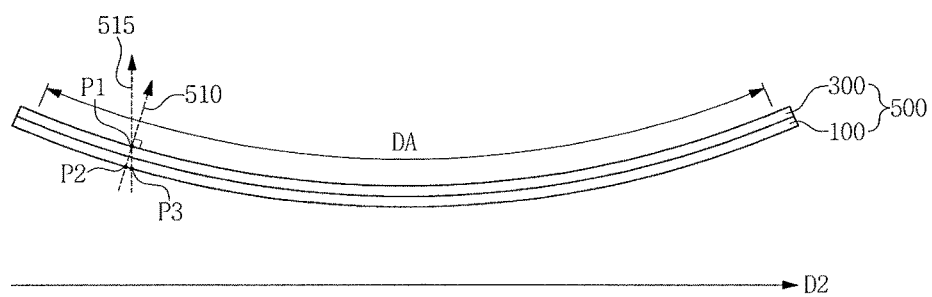
FIG. 1C illustrates a lateral view showing the LCD device according to the first exemplary embodiment.

FIG. 1A is a perspective view showing a liquid crystal display ("LCD") device 500 according to a first exemplary embodiment, FIG. 1B is a plan view showing the LCD device 500 according to the first exemplary embodiment, and FIG. 1C is a lateral view showing the LCD device 500 according to the first exemplary embodiment.

In reference to FIGS. 1A, 1B, and 1C, the LCD device 500 according to the first exemplary embodiment may include a display substrate 100, an opposing substrate 300, and a liquid crystal layer LC (refer to FIG. 3) between the display substrate 100 and the opposing substrate 300. In addition, the LCD device 500 may have a display area DA on which an image may be displayed, and the LCD device 500 may be bent in a direction, e.g., in a second direction D2.

At least a portion of the LCD substrate 100, or an entirety thereof, may be bent along the second direction D2, and the opposing substrate 300 coupled to the display substrate 100 may also be bent in the second direction D2.

For example, as illustrated in FIG. 1C, a first point P1 may be defined at a bent portion of the opposing substrate 300 in a lateral view (e.g., on a surface of the opposing substrate 300 facing away from the display substrate 100), and a normal line 510 passing through the first point P1 may be defined thereat. A point at which the normal line 510 meets the display substrate 100 (e.g., on a surface of the display substrate 100 facing away from the opposing substrate 300) may be defined as a second point P2. In addition, a line which passes through the first point P1 and is parallel to a user's line of sight may be defined as a sight line 515, and a point at which the sight line 515 meets the display substrate 100 may be defined as a third point P3.

Since the display substrate 100 and the opposing substrate 300 have curved shapes, a position of the second point P2 may differ from a position of the third point P3 in the display substrate 100. As such, a phenomenon in which the position of the second point P2 does not correspond to the position of the third point P3 is defined as misalignment between the display substrate 100 and the opposing substrate 300.

Figure 2:
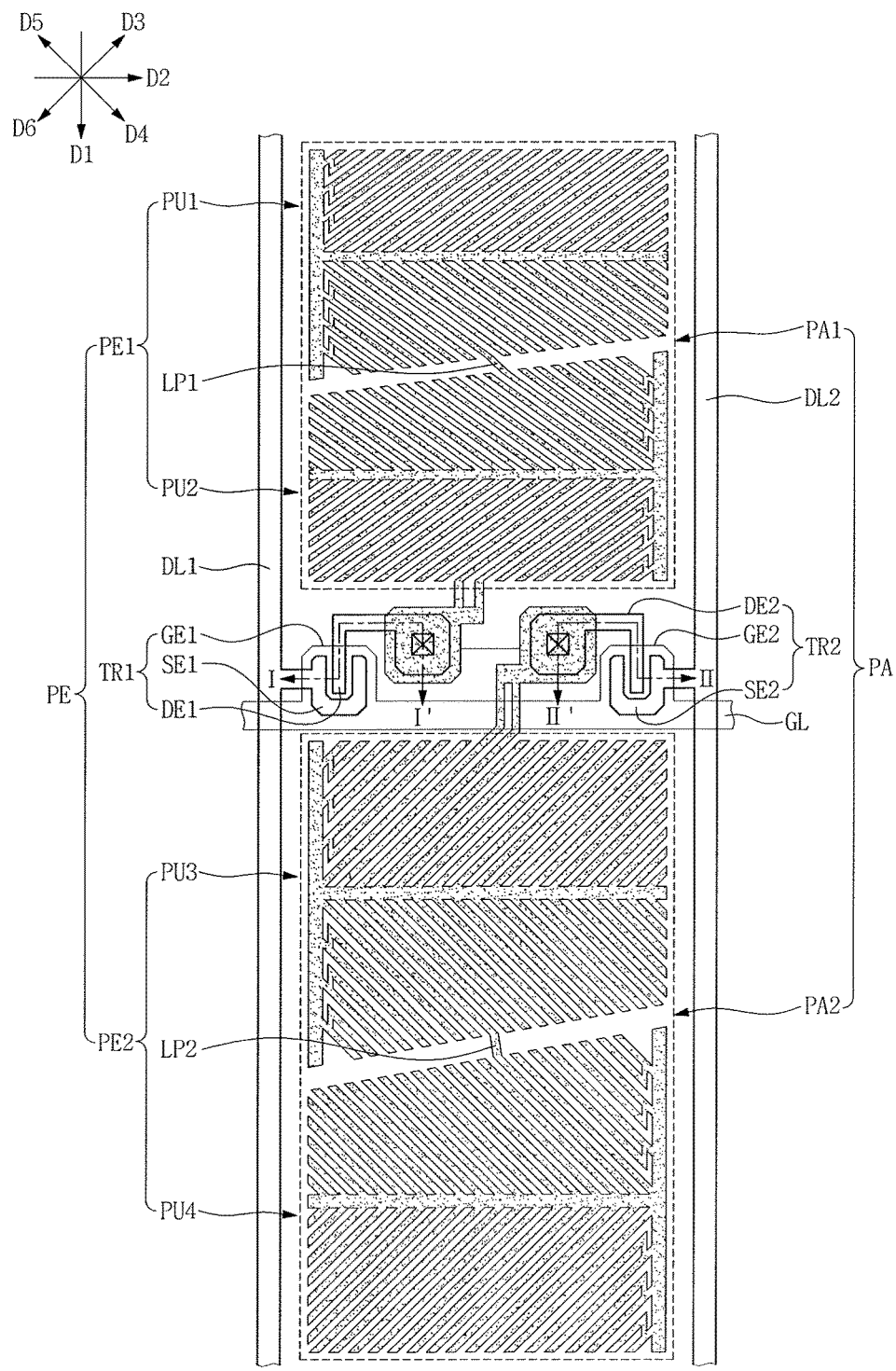
FIG. 2 illustrates a plan view showing a pixel of the LCD device according to the first exemplary embodiment.
Figure 3:
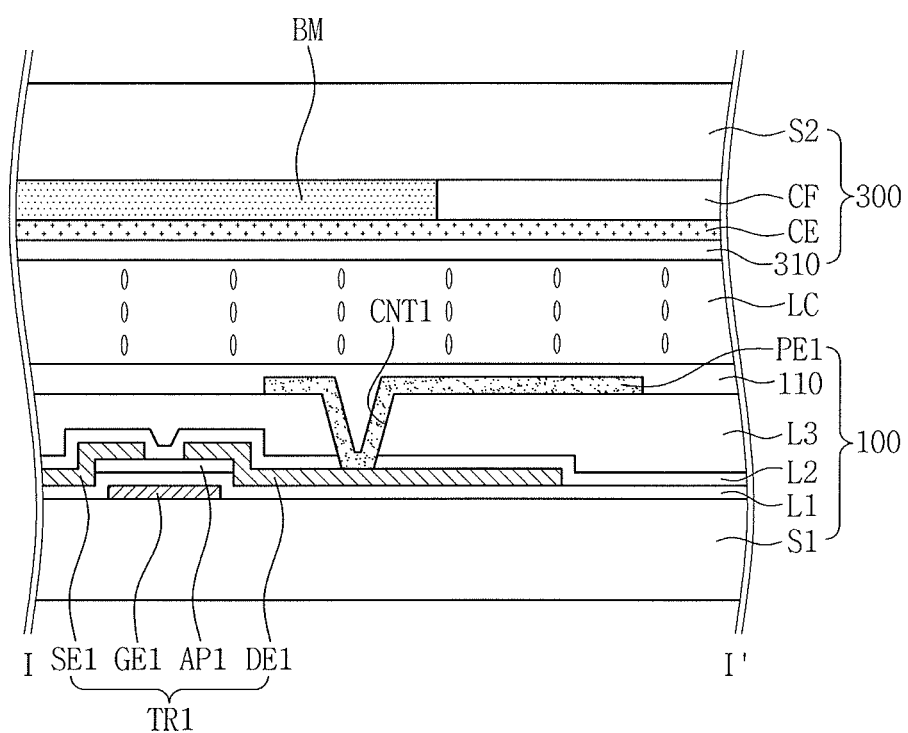
FIG. 3 illustrates a cross-sectional view taken along line I-I' of FIG. 2.
Figure 4:
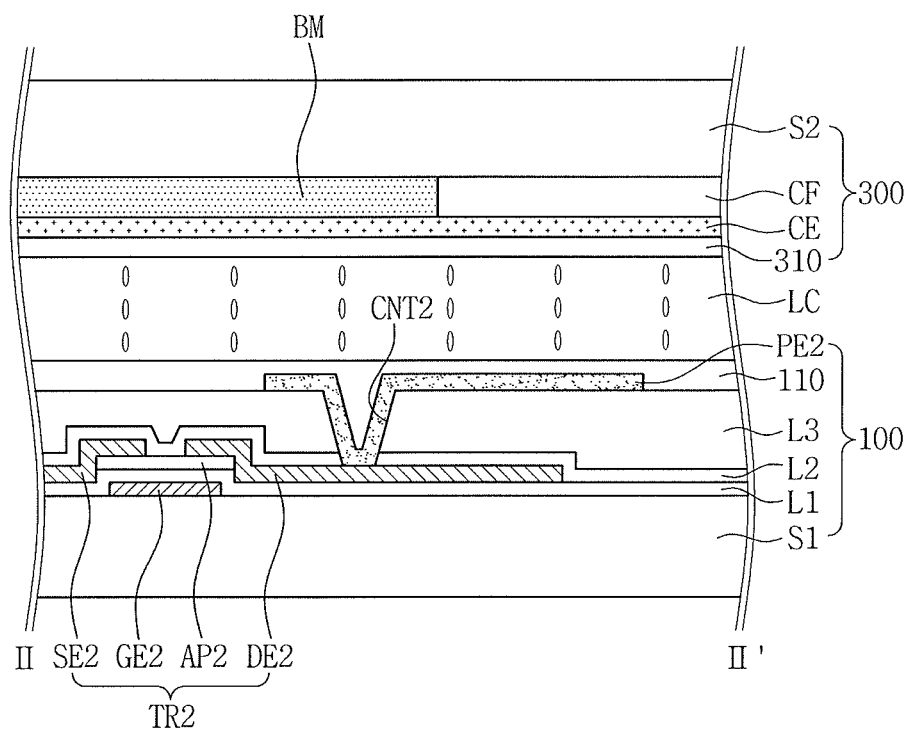
FIG. 4 illustrates a cross-sectional view taken along line II-II' of FIG. 2.

FIG. 2 is a plan view showing a pixel of the LCD device 500 according to the first exemplary embodiment, FIG. 3 is a cross-sectional view taken along line I-I' of FIG. 2, and FIG. 4 is a cross-sectional view taken along line II-II' of FIG. 2.

In reference to FIGS. 2, 3, and 4, the display substrate 100 according to the first exemplary embodiment may include a base substrate S1, a gate line GL, a first data line DL1, a second data line DL2, a first thin film transistor TR1, a second thin film transistor TR2, a pixel electrode PE, and a first alignment layer 110.

The base substrate S1 may have a plurality of pixel areas PA arranged in a matrix form.

According to the first exemplary embodiment, the pixel area PA may include a first sub-pixel area PA1 and a second sub-pixel area PA2. In addition, the pixel electrode PE may include a first sub-pixel electrode PE1 disposed in the first sub-pixel area PA1 and a second sub-pixel electrode PE2 disposed in the second sub-pixel area PA2.

The first sub-pixel electrode PE1 may include a first unit electrode PU1, a second unit electrode PU2 spaced apart from the first unit electrode PU1, and a first connecting portion LP1 configured to connect the first unit electrode PU1 and the second unit electrode PU2.

The second sub-pixel electrode PE2 may include a third unit electrode PU3, a fourth unit electrode PU3 spaced apart from the third unit electrode PU3, and a second connecting portion LP2 configured to connect the third unit electrode PU3 and the fourth unit electrode PU4.

The base substrate S1 may be an insulating substrate, such as a plastic substrate, for example, having flexibility and light transmission characteristics. However, the base substrate S1 may include or be formed of a hard substrate such as a glass substrate, for example.

The gate line GL may be disposed on the base substrate S1 parallel to the second direction D2, and may be electrically connected to the first thin film transistor TR1 and the second thin film transistor TR2 to transmit a gate signal to the first thin film transistor TR1 and the second thin film transistor TR2.

The first data line DL1 and the second data line DL2 may be disposed on the base substrate S1 parallel to the first direction D1, while being insulated from the gate line GL. The first data line DL1 may transmit a first data signal, and the second data line DL2 may transmit a second data signal.

For example, the first direction D1 may be parallel to the data line DL, and the second direction D2 may be parallel to the gate line GL. In another example, the first direction D1 may be inclined with respect to the data line DL, and the second direction D2 may be inclined with respect to the gate line GL.

According to the first exemplary embodiment, the first data line DL1 may extend along a side (e.g., a left side in FIG. 2) of the first and second sub-pixel electrodes PE1 and PE2, the second data line DL2 may extend along another side (e.g., a right side in FIG. 2) of the first and second sub-pixel electrodes PE1 and PE2, and the first and second sub-pixel electrodes PE1 and PE2 may be disposed between the first and second data lines DL1 and DL2.

The first thin film transistor TR1 may be electrically connected to the gate line GL, the first data line DL1, and the first sub-pixel electrode PE1. Accordingly, in a case where the first thin film transistor TR1 is turned on according to the gate signal, the first data signal may be applied to the first sub-pixel electrode PE1.

The first thin film transistor TR1 may include a first gate electrode GE1, a first active pattern AP1, a first source electrode SE1, and a first drain electrode DE1. The first gate electrode GE1 may be branched off from the gate line GL, and the first active pattern AP1 may be disposed on the first gate electrode GE1 with the first insulating layer L1 therebetween. As used herein, the first insulating layer L1 may also be referred to as a gate insulating layer.

The first source electrode SE1 may be branched off from the first data line DL1 to contact the first active pattern AP1, and the first drain electrode DE1 may be spaced apart from the first source electrode SE1 to contact the first active pattern AP1.

A second insulating layer L2 may cover the first thin film transistor TR1, and a third insulating layer L3 may be disposed on the second insulating layer L2. The first sub-pixel electrode PE1 may be disposed on the third insulating layer L3, and the first sub-pixel electrode PE1 may pass through a contact hole CNT1 (refer to FIG. 3) that is defined through the second and third insulating layers L2 and L3 so as to contact the first drain electrode DE1.

The second thin film transistor TR2 may be electrically connected to the gate line GL, the second data line DL2, and the second sub-pixel electrode PE2. Accordingly, in a case where the second thin film transistor TR2 is turned on according to the gate signal, the second data signal may be applied to the second sub-pixel electrode PE2.

The second thin film transistor TR2 may include a second gate electrode GE2, a second active pattern AP2, a second source electrode SE2, and a second drain electrode DE2. The second gate electrode GE2 may be branched off from the gate line GL, and the second active pattern AP2 may be disposed on the second gate electrode GE2 with the first insulating layer L1 interposed therebetween.

The second source electrode SE2 may be branched off from the second data line DL2 to contact the second active pattern AP2, and the second drain electrode DE2 may be spaced apart from the second source electrode SE2 to contact the second active pattern AP2.

The second insulating layer L2 may cover the second thin film transistor TR2, and the third insulating layer L3 may be disposed on the second insulating layer L2. The second sub-pixel electrode PE2 may be disposed on the third insulating layer L3, and the second sub-pixel electrode PE2 may pass through a contact hole CNT2 (refer to FIG. 4) that is defined through the second and third insulating layers L2 and L3 so as to contact the second drain electrode DE2.

According to the first exemplary embodiment, the first active pattern AP1 and the second active pattern AP2 may include a semiconductor material such as amorphous silicon and crystalline silicon, for example. However, the first active pattern AP1 and the second active pattern AP2 may include an oxide semiconductor such as IGZO, ZnO, $SnO_2$, $In_2O_3$, $Zn_2SnO_4$, $Ge_2O_3$, and $HfO_2$, for example, and/or may include a compound semiconductor such as GaAs, GaP, and InP, for example.

The first sub-pixel electrode PE1 and the second sub-pixel electrode PE2 may be respectively operated according to different data signals and, thus, may display gray levels different from each other. As such, a single pixel electrode may be divided into two sub-pixel electrodes so that the two sub-pixel electrodes may respectively represent different gray levels from each other and, thereby, side visibility may be improved.

The first alignment layer 110 may be disposed on the pixel electrode PE to contact the liquid crystal layer LC. The first alignment layer 110 aligns liquid crystal molecules of the liquid crystal layer LC so that a major axis of the liquid crystal molecules is perpendicular with respect to a surface of the display substrate 100 and a surface of the opposing substrate 300, while an electric field is absent between the display substrate 100 and the opposing substrate 300.

The opposing substrate 300 may include an opposing base substrate S2, a color filter CF, a light blocking member BM, a common electrode CE, and a second alignment layer 310.

The opposing base substrate S2 may be, for example, an insulating substrate having flexibility and light transmission characteristics. However, the opposing base substrate S2 may include or be formed of a hard substrate such as a glass substrate, for example.

The common electrode CE may be disposed on the opposing base substrate S2 and, along with the pixel electrode PE, may generate an electric field over the liquid crystal layer LC.

The light blocking layer BM may be disposed on the opposing base substrate S2 corresponding to positions of the first and second data lines DL1 and DL2 and the first and second thin film transistors TR1 and TR2. The color filter CF may be disposed on the opposing base substrate S2 so as to filter a color of light transmitted through the liquid crystal layer LC.

In an alternative exemplary embodiment, at least one of the light blocking layer BM and the color filter CF may be disposed on the base substrate S1.

Figure 5:
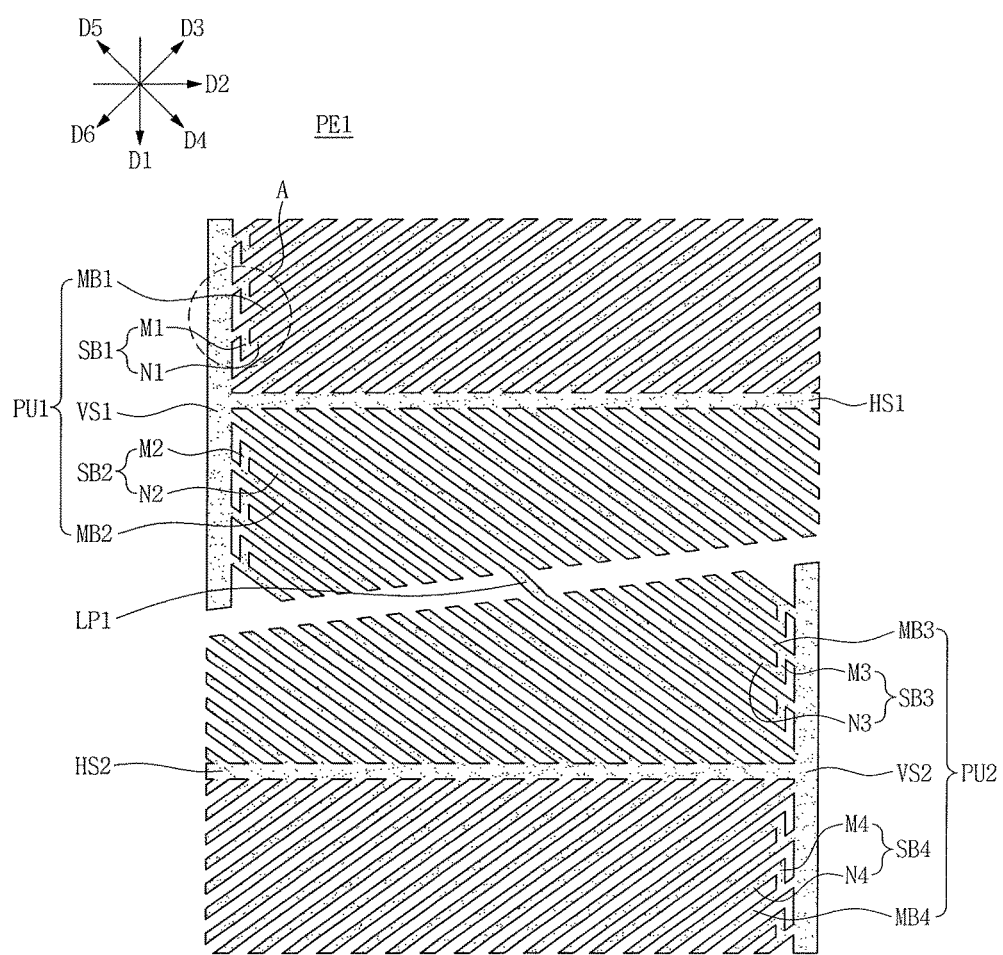
FIG. 5 illustrates a plan view showing a first sub-pixel electrode according to the first exemplary embodiment.
Figure 6:
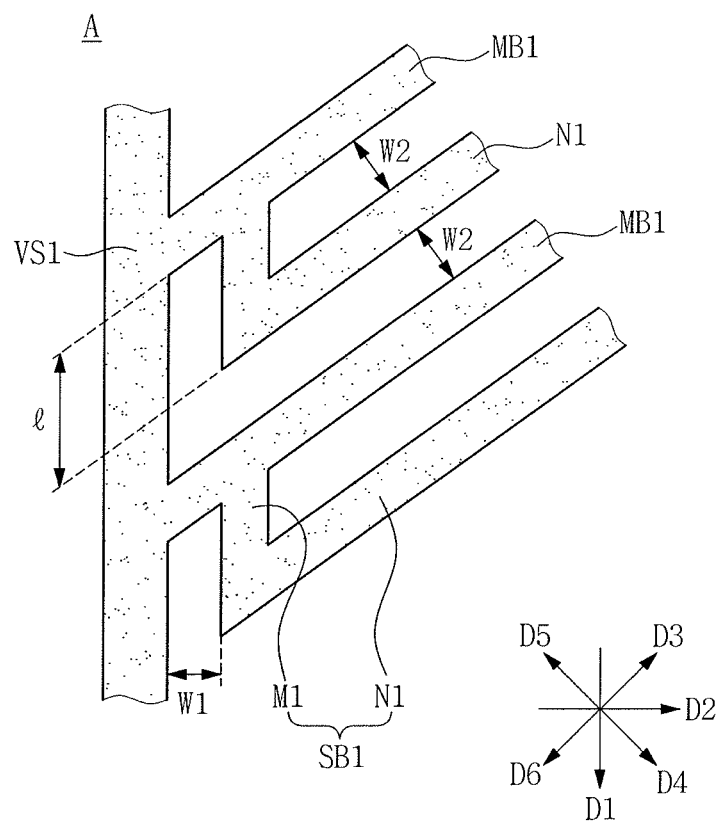
FIG. 6 illustrates an enlarged view showing a portion "A" of FIG. 5.
Figure 7:
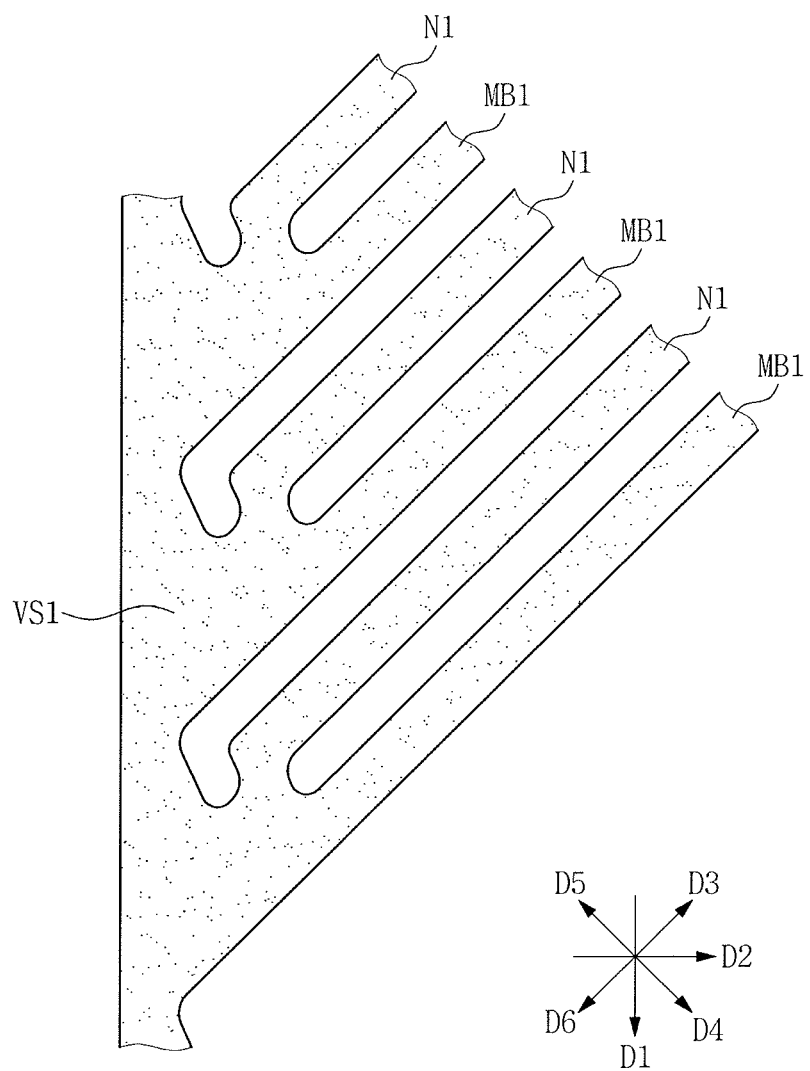
FIG. 7 illustrates a partial enlarged view showing a portion of a first sub-pixel electrode according to a second exemplary embodiment.

FIG. 5 is a plan view showing the first sub-pixel electrode PE1 according to the first exemplary embodiment, FIG. 6 is an enlarged view showing a portion "A" of FIG. 5, and FIG. 7 is a partial enlarged view showing a portion of a first sub-pixel electrode PE1 according to a second exemplary embodiment.

According to the exemplary embodiments, a second sub-pixel electrode PE2 may be substantially the same as the first sub-pixel electrode PE1 in terms of shape, despite having different sizes, and thus descriptions pertaining to the second sub-pixel electrode PE2 will be omitted.

In reference to FIGS. 5, 6, and 7, the first sub-pixel electrode PE1 according to the first exemplary embodiment may include a first unit electrode PU1 and a second unit electrode PU2 that may be arranged, e.g., spaced apart from each other, in a first direction D1. The first connecting portion LP1 may connect the first unit electrode PU1 and the second unit electrode PU2. For example, the first connecting portion LP1 may extend at an oblique angle with respect to each of the first and second directions D1 and D2 in a space between the first a second unit electrode PU1 and PU2.

The first unit electrode PU1 may include a first vertical stem portion VS1 extending in a first direction D1, a first horizontal stem portion HS1 extending from the first vertical stem portion VS1 in a second direction D2 intersecting, e.g., perpendicular to, the first direction D1, a plurality of first main branch portions MB1 extending from at least one of the first vertical stem portion VS1 and the first horizontal stem portion HS1 in a third direction D3 inclined, e.g., at an oblique angle, with respect to the first direction D1 and the second direction D2, a plurality of second main branch portions MB2 extending from at least one of the first vertical stem portion VS1 and the first horizontal stem portion HS1 in a fourth direction D4 inclined, e.g., at an oblique angle, with respect to the first direction D1 and the second direction D2, a plurality of first sub-branch portions SB1 extending from at least one of the plurality of first main branch portions MB1, and a plurality of second sub-branch portions SB2 extending from at least one of the plurality of second main branch portions MB2.

The first sub-branch portion SB1 may extend from the first main branch portion MB1 connected to the first vertical stem portion VS1, and the second sub-branch portion SB2 may extend from the second main branch portion MB2 connected to the first vertical stem portion VS1. The first sub-branch portion SB1 may include a first protrusion portion M1 extending, e.g., directly, from the first main branch portion MB1 substantially parallel to the first vertical stem portion VS1, and a first parallel portion N1 extending from the first protrusion portion M1 substantially parallel to the first main branch portion MB1. The second sub-branch portion SB2 may include a second protrusion portion M2 extending, e.g., directly, from the second main branch portion MB2 substantially parallel to the first vertical stem portion VS1, and a second parallel portion N2 extending from the second protrusion portion M2 substantially parallel to the second main branch portion MB2.

The second unit electrode PU2 may include a second vertical stem portion VS2 extending in a first direction D1, a second horizontal stem portion HS2 extending from the second vertical stem portion VS2 in a second direction D2 intersecting the first direction D1, a plurality of third main branch portions MB3 extending from at least one of the second vertical stem portion VS2 and the second horizontal stem portion HS2 in a fifth direction D5 inclined with respect to the first direction D1 and the second direction D2, a plurality of fourth main branch portions MB4 extending from at least one of the second vertical stem portion VS2 and the second horizontal stem portion HS2 in a sixth direction D6 inclined with respect to the first direction D1 and the second direction D2, a plurality of third sub-branch portions SB3 extending from at least one of the plurality of third main branch portions MB3, and a plurality of fourth sub-branch portions SB4 extending from at least one of the plurality of fourth main branch portions MB4.

The third sub-branch portion SB3 may extend from the third main branch portion MB3 connected to the second vertical stem portion VS2, and the fourth sub-branch portion SB4 may extend from the fourth main branch portion MB4 connected to the second vertical stem portion VS2. The third sub-branch portion SB3 may include a third protrusion portion M3 extending, e.g., directly, from the third main branch portion MB3 substantially parallel to the second vertical stem portion VS2, and a third parallel portion N3 extending from the third protrusion portion M3 substantially parallel to the third main branch portion MB3. The fourth sub-branch portion SB4 may include a fourth protrusion portion M4 extending, e.g., directly, from the fourth main branch portion MB4 substantially parallel to the second vertical stem portion VS2, and a fourth parallel portion N4 extending from the fourth protrusion portion M4 substantially parallel to the fourth main branch portion MB4.

According to the first exemplary embodiment, the first and second vertical stem portions VS1 and VS2 may extend parallel to the first direction D1, and the first and second horizontal stem portions HS1 and HS2 may extend parallel to the second direction D2. However, in another example, the first and second vertical stem portions VS1 and VS2 may extend in an inclined manner with respect to the first direction D1, and the first and second horizontal stem portions HS1 and HS2 may extend in an inclined manner with respect to the second direction D2.

The first vertical stem portion VS1 and the second vertical stem portion VS2 may be respectively disposed at one side (a left side in FIG. 5) of the first sub-pixel area PA1 and another side (a right side in FIG. 5) of the first sub-pixel area PA1. The first horizontal stem portion HS1 may extend in the second direction D2 from the center of the first vertical stem portion VS1, and the second horizontal stem portion HS2 may extend in the second direction D2 from the center of the second vertical stem portion VS2.

An angle formed by each of the third direction D3, the fourth direction D4, the fifth direction D5, and the sixth direction D6 with respect to the first direction D1 and the second direction D2 may be about 45 degrees in a plan view.

The first protrusion portion M1 according to the first exemplary embodiment is depicted as extending in a lower direction with respect to the first direction D1 in a plan view. However, in reference to FIG. 7, the first protrusion portion M1 according to the second exemplary embodiment may extend in an upper direction with respect to the first direction D1 in a plan view. In other words, the first, second, third, and fourth protrusion portions M1, M2, M3, and M4 may extend in one of an upper direction and a lower direction with respect to the first direction D1 in a plan view.

The first, second, third, and fourth sub-branch portions SB1, SB2, SB3, and SB4 according to the first exemplary embodiment are depicted as extending from each single one of the first, second, third, and fourth main branch portions MB1, MB2, MB3, and MB4, respectively. However, in an alternative exemplary embodiment, the first, second, third, and fourth sub-branch portions SB1, SB2, SB3, and SB4 may extend from the first, second, third, and fourth main branch portions MB1, MB2, MB3, and MB4 for every two or more first, second, third, and fourth main branch portions MB1, MB2, MB3, and MB4, respectively, and may be formed in an irregular manner.

In a case where the first sub-pixel electrode PE1 has the aforementioned structure, the first domain may be defined by the first main branch portion MB1 and the first parallel portion N1, the second domain may be defined by the second main branch portion MB2 and the second parallel portion N2, the third domain may be defined by the third main branch portion MB3 and the third parallel portion N3, and the fourth domain may be defined by the fourth main branch portion MB4 and the fourth parallel portion N4.

At least one second main branch portion MB2 defining the second domain and at least one third main branch portion MB3 defining the third domain may be connected by the first connecting portion LP1. A boundary area between the second domain and the third domain may have an angle in a range of about 5 degrees to about 45 degrees with respect to the second direction D2. In other words, as illustrated in FIG. 5, the area of the space between the first and second unit electrodes PU1 and PU2 may angled, e.g., at an oblique angle, with respect to the second direction D2. By employing such a structure, liquid crystal molecules disposed at the boundary area between the second domain and the third domain may be aligned parallel to the second main branch portion MB2 and the third main branch portion MB3. As such, in a case where the first, second, third, and fourth domains are arranged sequentially in the first direction D1, viewing angle properties may be improved, and even in the case where the LCD device is curved in the second direction D2, alignment defects that may arise from misalignments between the display substrate and the opposing substrate may be prevented.

The first protrusion portion M1 and the second protrusion portion M2 according to the first exemplary embodiment may be parallel to the first vertical stem portion VS1. However, the first protrusion portion M1 and the second protrusion portion M2 may be formed in an inclined manner with respect to the first vertical stem portion VS1.

Similarly to the first protrusion portion M1 and the second protrusion portion M2, the third protrusion portion M3 and the fourth protrusion portion M4 according to the first exemplary embodiment may be parallel to the second vertical stem portion VS2. However, the third protrusion portion M3 and the fourth protrusion portion M4 may be formed in an inclined manner with respect to the second vertical stem portion VS2.

In an exemplary embodiment, the pixel electrode may be patterned through a photolithography process using an exposure apparatus and, in such a case, due to a resolution limit of the exposure apparatus, the protrusion portion and the vertical stem portion may be formed in an inclined manner in an exposure process (refer to FIG. 7).

Accordingly, hereinafter, the term "substantially parallel" is to be understood to include a case in which the protrusion portion and the vertical stem portion are substantially parallel to each other and a case in which the protrusion portion and the vertical stem portion are formed in an inclined manner with respect to each other within the resolution limit of an exposure apparatus.

A distance W1 between the first protrusion portion M1 and the first vertical stem portion VS1 may be in a range of about 2 μm to about 10 μm, e.g., about 3 μm to about 6 μm. Similarly to the distance W1 between the first protrusion portion M1 and the first vertical stem portion VS1, a distance between the second protrusion portion M2 and the first vertical stem portion VS1, a distance between the third protrusion portion M3 and the second vertical stem portion VS2, and a distance between the fourth protrusion portion M4 and the second vertical stem portion VS2 may be in a range of about 2 μm to about 10 μm, e.g., about 3 μm to about 6 μm.

The first protrusion portion M1 may have a length l in a range of about 2 μm to about 10 μm and, similarly, the second, third, and fourth protrusion portions M2, M3, and M4 may have a length in a range of about 2 μm to about 10 μm. In an exemplary embodiment, the first protrusion portion M1 may extend from between the first main branch portion MB1 and the first vertical stem portion VS1 in the exposure process due to the resolution limit of an exposure apparatus (refer to FIG. 7).

A distance W2 between the first parallel portion N1 and the first main branch portion MB1 may be in a range of about 2 μm to about 10 μm and, similarly, a distance between the second parallel portion N2 and the second main branch portion MB2, a distance between the third parallel portion N3 and the third main branch portion MB3, and a distance between the fourth parallel portion N4 and the fourth main branch portion MB4 may be in a range of about 2 μm to about 10 μm.

The first unit electrode PU1 according to the first exemplary embodiment may have a bent slit structure defined by the first vertical stem portion VS1, the first main branch portion MB1, and the first sub-branch portion SB1 at a point from which the first vertical stem portion VS1 starts extending. As such, the pixel electrode according to exemplary embodiments may include the plurality of sub-branch portions having the protrusion portion substantially parallel to the vertical stem portion, such that effects of a fringe field generated outwardly of the vertical stem portion toward the pixel area may be cancelled. Accordingly, transmittance degradation of the LCD device that may arise from irregular movements of liquid crystal molecules in the vicinity of the vertical stem portion may be significantly reduced or prevented.

Figure 8:
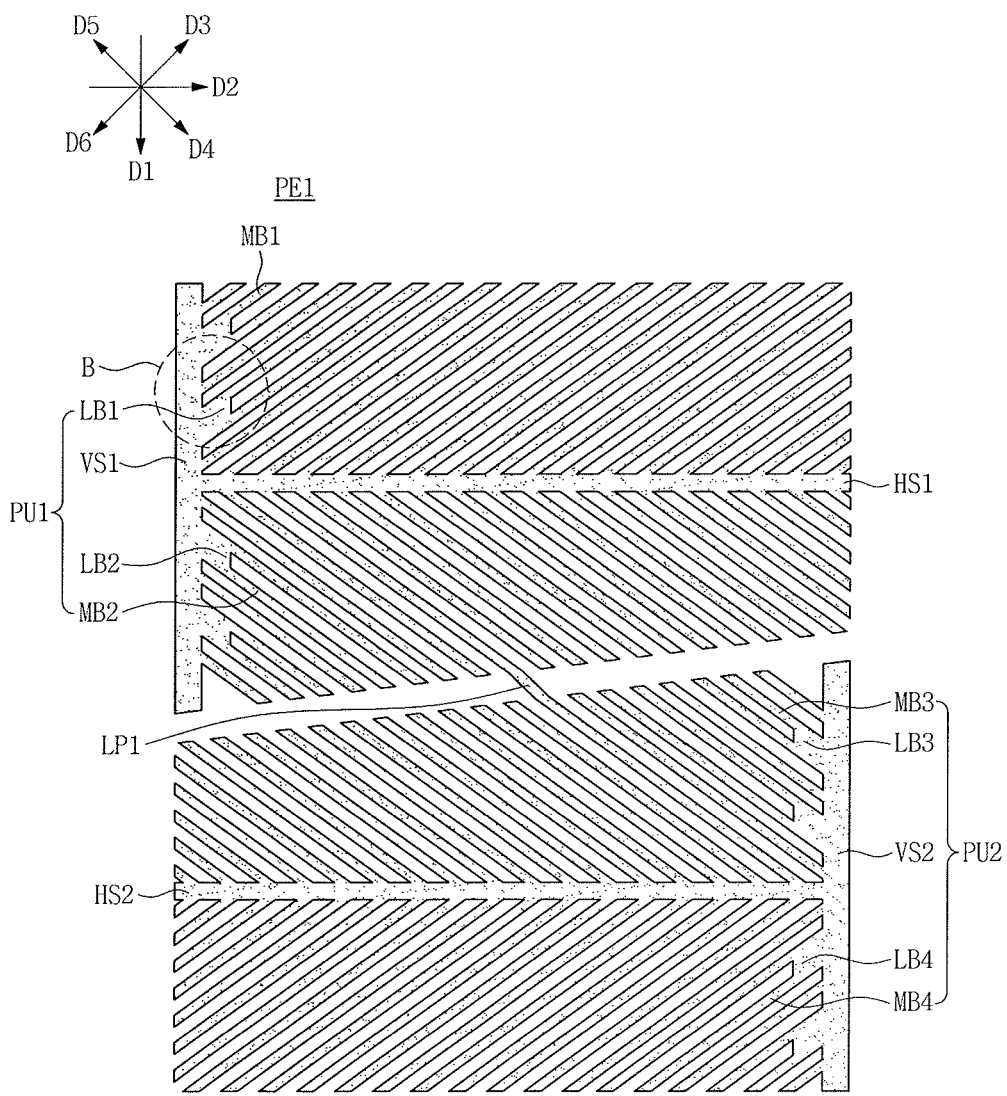
FIG. 8 illustrates a plan view showing a first sub-pixel electrode according to a third exemplary embodiment.
Figure 9:
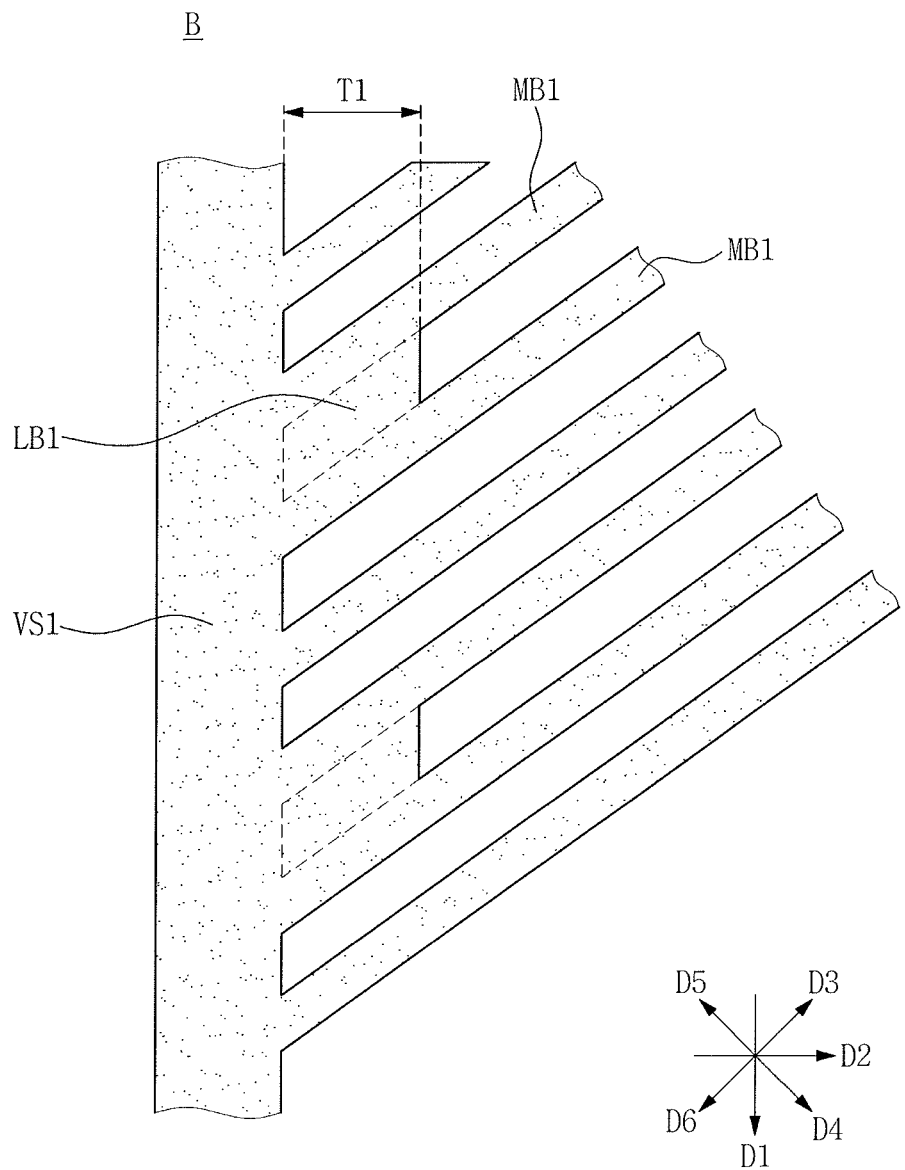
FIG. 9 illustrates a partial enlarged view showing a portion "B" of FIG. 8.

FIG. 8 is a plan view showing a first sub-pixel electrode PE1 according to a third exemplary embodiment, and FIG. 9 is a partial enlarged view showing a portion "B" of FIG. 8. The descriptions provided hereinabove with respect to the first sub-pixel electrode PE1 according to the first exemplary embodiment will be omitted in the descriptions with respect to the first sub-pixel electrode PE1 according to the third exemplary embodiment.

In reference to FIGS. 8 and 9, the first sub-pixel electrode PE1 according to the third exemplary embodiment may include a first unit electrode PU1 and a second unit electrode PU2 arranged in a first direction D1, and a first connecting portion LP1 configured to connect the first unit electrode PU1 and the second unit electrode PU2.

The first unit electrode PU1 may include a first vertical stem portion VS1 extending in a first direction D1, a first horizontal stem portion HS1 extending from the first vertical stem portion VS1 in a second direction D2 intersecting the first direction D1, a plurality of first main branch portions MB1 extending from at least one of the first vertical stem portion VS1 and the first horizontal stem portion HS1 in a third direction D3 inclined with respect to the first direction D1 and the second direction D2, a plurality of second main branch portions MB2 extending from at least one of the first vertical stem portion VS1 and the first horizontal stem portion HS1 in a fourth direction D4 inclined with respect to the first direction D1 and the second direction D2, a first connecting branch portion LB1 configured to connect at least two first main branch portions MB1 of the plurality of first main branch portions MB1 that are adjacent to each other, and a second connecting branch portion LB2 configured to connect at least two second main branch portions MB2 of the plurality of second main branch portions MB2 that are adjacent to each other.

The first connecting branch portion LB1 and the second connecting branch portion LB2 may be connected to the first vertical stem portion VS1 and, in such a case, the first connecting branch portion LB1 and the second connecting branch portion LB2 may have a width T1 in a range of about 2 μm to about 10 μm in the second direction D2.

The second unit electrode PU2 may include a second vertical stem portion VS2 extending in the first direction D1, a second horizontal stem portion HS2 extending from the second vertical stem portion VS2 in the second direction D2 intersecting the first direction D1, a plurality of third main branch portions MB3 extending from at least one of the second vertical stem portion VS2 and the second horizontal stem portion HS2 in a fifth direction D5 inclined with respect to the first direction D1 and the second direction D2, a plurality of fourth main branch portions MB4 extending from at least one of the second vertical stem portion VS2 and the second horizontal stem portion HS2 in a sixth direction D6 inclined with respect to the first direction D1 and the second direction D2, a third connecting branch portion LB3 configured to connect at least two third main branch portions MB3 of the plurality of third main branch portions MB3 that are adjacent to each other, and a fourth connecting branch portion LB4 configured to connect at least two fourth main branch portions MB4 of the plurality of fourth main branch portions MB4 that are adjacent to each other.

The third connecting branch portion LB3 and the fourth connecting branch portion LB4 may be connected to the second vertical stem portion VS2 and, in such a case, the third connecting branch portion LB3 and the fourth connecting branch portion LB4 may have a width in a range of about 2 μm to about 10 μm in the second direction D2.

As such, a pixel electrode according to the third exemplary embodiment may include at least one connecting branch portion configured to connect at least two main branch portions, such that effects of a fringe field generated outwardly of the vertical stem portion toward a pixel area may be cancelled. Accordingly, transmittance degradation of the LCD device that may arise from irregular movements of liquid crystal molecules in the vicinity of the vertical stem portion may be significantly reduced or prevented.

By way of Summation and review, in a case where a LCD device is utilized to form a curved display device that is curved in a predetermined direction, texture may arise from misalignment between an electrode of an upper substrate and an electrode of a lower substrate. In order to obviate the misalignment, an attempt was made for a structure of a pixel electrode with a plurality of domains, each domain having different liquid crystal inclinations from one another, respectively arranged in directions perpendicular to a direction in which the LCD device is curved. Such a structure of pixel electrode may include a stem portion and a plurality of branch portions extending from the stem portion in different directions from one another in an inclined manner. However, in such a pixel electrode structure of a LCD device, it may be difficult to align liquid crystal molecules at a portion where a branch portion starts extending from a stem portion in a predetermined direction due to a fringe field of both the stem portion and the branch portion. Accordingly, texture may appear at a portion where the branch portion starts extending from the stem portion, and thus transmittance of the LCD device may be degraded.

In contrast, the LCD device according to exemplary embodiments may efficiently reduce or prevent texture arising from misalignment when the LCD device is utilized to form a curved display device, and may efficiently reduce or prevent irregular movements of liquid crystal molecules disposed above a stem portion. That is, the LCD device according to exemplary embodiments may include domains that are sequentially arranged in the first direction, and thus viewing angle properties thereof may be improved. Further, even in the case where the LCD device is curved in the second direction D2, alignment defects that may arise from misalignments between the display substrate and the opposing substrate may be prevented. In addition, by including the first sub-pixel electrode and the second sub-pixel electrode that represent different gray levels from each other, side visibility may be improved. Therefore, the LCD device according to one or more exemplary embodiments may efficiently reduce or prevent degradation of transmittance arising from irregular movements of liquid crystal molecules that may occur in the vicinity of a vertical stem portion.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display substrate, comprising:
a base substrate having a plurality of pixel areas; and a pixel electrode in each of the pixel areas, the pixel electrode including:
- a vertical stem portion extending in a first direction, the vertical stem portion forming an edge of the pixel area,
- a horizontal stem portion extending from a center of the vertical stem portion in a second direction intersecting the first direction,
- a plurality of main branch portions extending from at least one of the vertical stem portion and the horizontal stem portion in an inclined manner, and
- a sub-branch portion between two main branch portions of the plurality of main branch portions that are parallel with and adjacent to each other, the sub-branch portion extending only from at least one of the plurality of main branch portions that extends from the vertical stem portion among the vertical and horizontal stem portions,
- wherein the sub-branch portion is parallel to the at least one of the plurality of main branch portions.

2. The display substrate as claimed in claim 1, wherein the sub-branch portion includes:
- a protrusion portion extending from the at least one of the plurality of main branch portions in a direction substantially parallel to the vertical stem portion; and
- a parallel portion extending from the protrusion portion in a direction substantially parallel to the at least one of the plurality of main branch portions.

3. The display substrate as claimed in claim 2, wherein the protrusion portion is spaced apart from the vertical stem portion by a distance in a range of about 2 μm to about 10 μm.

4. The display substrate as claimed in claim 2, wherein the protrusion portion has a length in a range of about 2 μm to about 10 μm in the first direction in a plan view.

5. The display substrate as claimed in claim 2, wherein the protrusion portion extends in the first direction in a plan view in one of an upper direction and a lower direction with respect to the at least one main branch portion.

6. The display substrate as claimed in claim 2, wherein the parallel portion is spaced apart from the at least one main branch portion by a distance in a range of about 2 μm to about 10 μm.

7. A display substrate, comprising:
- a base substrate having a plurality of pixel areas; and
- a pixel electrode in the pixel area, the pixel electrode including:
  - a vertical stem portion extending in a first direction, the vertical stem portion forming an edge of the pixel area,
  - a horizontal stem portion extending from a center of the vertical stem portion in a second direction intersecting the first direction,
  - a plurality of main branch portions, each main branch portion having at least one visible boundary extending from at least one of the vertical stem portion and the horizontal stem portion in an inclined manner, and
  - a plurality of connecting branch portions on a same side of the horizontal branch portion, with each connecting branch portion connecting at least two adjacent and parallel main branch portions of the plurality of main branch portions, each connecting branch portion at least partially parallels the main branch portions and directly contacts the vertical stem portion, and each connecting branch portion having a substantial equal width in the second direction.

8. The display substrate as claimed in claim 7, wherein each connecting branch portion has a width in a range of about 2 μm to about 10 μm in the second direction.

9. The display substrate as claimed in claim 7, wherein each connecting branch portion is separated from an adjacent connecting branch portion by no more than three main branch portions.

10. The display substrate as claimed in claim 7, wherein each connecting branch portion is separated from an adjacent connecting branch portion by at least three main branch portions.

11. A liquid crystal display ("LCD") device, comprising:
- a display substrate;
- an opposing substrate facing the display substrate; and
- a liquid crystal layer between the display substrate and the opposing substrate, the display substrate including:
  - a base substrate having a plurality of pixel areas, and
  - a pixel electrode in each of the pixel areas, the pixel electrode including:
    - a vertical stem portion extending in a first direction, the vertical stem portion forming an edge of the pixel area,
    - a horizontal stem portion extending from a center of the vertical stem portion in a second direction intersecting the first direction,
    - a plurality of main branch portions extending from at least one of the vertical stem portion and the horizontal stem portion in an inclined manner, and
    - a sub-branch portion between two main branch portions of the plurality of main branch portions that are parallel with and adjacent to each other, the sub-branch portion extending only from at least one of the plurality of main branch portions that extends from the vertical stem portion among the vertical and horizontal stem portions, wherein
    - the sub-branch portion is parallel to the at least one of the plurality of main branch portions.

12. The LCD device as claimed in claim 11, wherein the sub-branch portion includes:
- a protrusion portion extending from the at least one of the plurality of main branch portions in a direction substantially parallel to the vertical stem portion; and
- a parallel portion extending from the protrusion portion in a direction substantially parallel to the at least one of the plurality of main branch portions.

13. The LCD device as claimed in claim 12, wherein the protrusion portion is spaced apart from the vertical stem portion by a distance in a range of about 2 μm to about 10 μm.

14. The LCD device as claimed in claim 12, wherein the protrusion portion has a length in a range of about 2 μm to about 10 μm in the first direction in a plan view.

15. The LCD device as claimed in claim 12, wherein the protrusion portion extends from the at least one of the plurality of main branch portions in the first direction in a plan view in one of an upper direction and a lower direction with respect to the at least one of the plurality of main branch portions.

16. The LCD device as claimed in claim 12, wherein the parallel portion is spaced apart from the at least one main branch portion by a distance in a range of about 2 μm to about 10 μm.

17. The LCD device as claimed in claim 11, further comprising a connecting branch portion connecting at least one pair of main branch portions adjacent to each other among the plurality of main branch portions.

18. The LCD device as claimed in claim 17, wherein the connecting branch portion is connected to the vertical stem portion.

19. The LCD device as claimed in claim 17, wherein the connecting branch portion has a width in a range of about 2 μm to about 10 μm in the second direction.

20. A display substrate, comprising:
- a base substrate having a plurality of pixel areas; and
- a pixel electrode in each of the pixel areas, the pixel electrode including:
    - a vertical stem portion extending in a first direction, the vertical stem portion forming an edge of the pixel area,
    - a horizontal stem portion extending from a center of the vertical stem portion in a second direction intersecting the first direction,
    - a plurality of main branch portions extending from at least one of the vertical stem portion and the horizontal stem portion in an inclined manner, and
    - a sub-branch portion between two main branch portions of the plurality of main branch portions that are parallel with and adjacent to each other, the sub-branch portion extending only from at least one of the plurality of main branch portions that extends from the vertical stem portion among the vertical and horizontal stem portions, wherein
    - the sub-branch portion comprises a protrusion portion extending from the main branch portion in a direction inclined to the vertical stem portion, and a parallel portion extending from the protrusion portion in a direction substantially parallel to the main branch portion.

* * * * *